(12) United States Patent
Morris et al.

(10) Patent No.: US 6,252,365 B1
(45) Date of Patent: *Jun. 26, 2001

(54) BREAKER/STARTER WITH AUTO-CONFIGURABLE TRIP UNIT

(75) Inventors: Robert Allen Morris, Burlington; James A. Marple, Newtown; Charles S. Pitzen, Farmington, all of CT (US); Michael H. Thomas, Amersfoot (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/375,872

(22) Filed: Aug. 17, 1999

(51) Int. Cl.[7] .................. H02P 1/28; H02H 3/13
(52) U.S. Cl. .................. 318/455; 318/430; 318/453; 318/473; 361/43; 361/94; 361/24; 361/31
(58) Field of Search .................. 318/434–499, 318/798, 807; 364/188, 131, 138, 191; 361/20–32, 64, 68, 87, 93, 96, 97, 115; 200/144–153

(56) References Cited

U.S. PATENT DOCUMENTS

| | | | |
|---|---|---|---|
| D. 367,265 | 2/1996 | Yamagata et al. | D13/160 |
| 2,340,682 | 2/1944 | Powell | 200/147 |
| 2,719,203 | 9/1955 | Gelzheiser et al. | 200/144 |
| 2,937,254 | 5/1960 | Ericson | 200/114 |
| 3,158,717 | 11/1964 | Jencks et al. | 200/116 |
| 3,162,739 | 12/1964 | Klein et al. | 200/88 |
| 3,197,582 | 7/1965 | Norden | 200/50 |
| 3,307,002 | 2/1967 | Cooper | 200/116 |
| 3,517,356 | 6/1970 | Hanafusa | 335/16 |
| 3,631,369 | 12/1971 | Menocal | 337/110 |
| 3,803,455 | 4/1974 | Willard | 317/33 SC |
| 3,883,781 | 5/1975 | Cotton | 317/14 R |
| 3,996,499 | * 12/1976 | Gary et al. | 317/36 TD |
| 4,007,401 | * 2/1977 | Kimmel et al. | 317/36 TD |
| 4,129,762 | 12/1978 | Bruchet | 200/153 G |

(List continued on next page.)

FOREIGN PATENT DOCUMENTS

| | | |
|---|---|---|
| 819 008 | 12/1974 | (BE) . |
| 897 691 | 4/1984 | (BE) . |
| 12 27 978 | 11/1966 | (DE) . |
| 30 47 360 | 6/1982 | (DE) . |
| 38 02 184 | 8/1989 | (DE) . |
| 38 43 277 | 6/1990 | (DE) . |
| 44 19 240 | 1/1995 | (DE) . |
| 0 061 092 | 9/1982 | (EP) . |
| 0 064 906 | 11/1982 | (EP) . |
| 0 066 486 | 12/1982 | (EP) . |
| 0 076 719 | 4/1983 | (EP) . |
| 0 117 094 | 8/1984 | (EP) . |
| 0 140 761 | 5/1985 | (EP) . |
| 0 174 904 | 3/1986 | (EP) . |
| 0 196 241 | 10/1986 | (EP) . |
| 0 224 396 | 6/1987 | (EP) . |
| 0 235 479 | 9/1987 | (EP) . |
| 0 239 460 | 9/1987 | (EP) . |
| 0 258 090 | 3/1988 | (EP) . |
| 0 264 313 | 4/1988 | (EP) . |
| 0 264 314 | 4/1988 | (EP) . |
| 0 283 189 | 9/1988 | (EP) . |
| 0 283 358 | 9/1988 | (EP) . |
| 0 291 374 | 11/1988 | (EP) . |
| 0 295 155 | 12/1988 | (EP) . |

(List continued on next page.)

Primary Examiner—Paul Ip
(74) Attorney, Agent, or Firm—Cantor Colburn LLP; Carl B. Horton

(57) ABSTRACT

A combination circuit breaker/motor starter includes a circuit breaker trip unit having a microprocessor and at least one removably connectable contactor or other functional module. The functional module is encoded with an identifier, such that the microprocessor can determine the type of functional module and appropriate configuration parameters, such as trip times, for the particular application of the functional module. Power is supplied continuously to the trip unit during motor overload or short circuit conditions.

19 Claims, 5 Drawing Sheets

U.S. PATENT DOCUMENTS

| | | | |
|---|---|---|---|
| 4,144,513 | 3/1979 | Shafer et al. | 335/46 |
| 4,158,119 | 6/1979 | Krakik | 200/240 |
| 4,165,453 | 8/1979 | Hennemann | 200/153 G |
| 4,166,988 | 9/1979 | Ciarcia et al. | 335/9 |
| 4,220,934 | 9/1980 | Wafer et al. | 335/16 |
| 4,255,732 | 3/1981 | Wafer et al. | 335/16 |
| 4,259,651 | 3/1981 | Yamat | 335/16 |
| 4,263,492 | 4/1981 | Maier et al. | 200/288 |
| 4,276,527 | 6/1981 | Gerbert-Gaillard et al. | 335/39 |
| 4,297,663 | 10/1981 | Seymour et al. | 335/20 |
| 4,301,342 | 11/1981 | Castonguay et al. | 200/153 SC |
| 4,360,852 | 11/1982 | Gilmore | 361/98 |
| 4,368,444 | 1/1983 | Preuss et al. | 335/166 |
| 4,368,500 * | 1/1983 | Conroy et al. | 361/94 |
| 4,375,021 | 2/1983 | Pardini et al. | 200/147 B |
| 4,375,022 | 2/1983 | Daussin et al. | 200/148 R |
| 4,376,270 | 3/1983 | Staffen | 335/21 |
| 4,379,317 * | 4/1983 | Conroy et al. | 361/85 |
| 4,383,146 | 5/1983 | Bur | 200/17 R |
| 4,392,036 | 7/1983 | Troebel et al. | 200/322 |
| 4,393,283 | 7/1983 | Masuda | 200/51.09 |
| 4,401,872 | 8/1983 | Boichot-Castagne et al. | 200/153 G |
| 4,409,573 | 10/1983 | DiMarco et al. | 335/16 |
| 4,435,690 | 3/1984 | Link et al. | 335/37 |
| 4,467,297 | 8/1984 | Boichot-Castagne et al. | 335/8 |
| 4,468,645 | 8/1984 | Gerbert-Gaillard et al. | 335/42 |
| 4,470,027 | 9/1984 | Link et al. | 335/16 |
| 4,479,143 | 10/1984 | Watanabe et al. | 358/44 |
| 4,488,133 | 12/1984 | McClellan et al. | 335/16 |
| 4,492,941 | 1/1985 | Nagel | 335/13 |
| 4,541,032 | 9/1985 | Schwab | 361/331 |
| 4,546,224 | 10/1985 | Mostosi | 200/153 G |
| 4,550,360 | 10/1985 | Dougherty | 361/93 |
| 4,562,419 | 12/1985 | Preuss et al. | 335/195 |
| 4,589,052 | 5/1986 | Dougherty | 361/94 |
| 4,595,812 | 6/1986 | Tamaru et al. | 200/307 |
| 4,611,187 | 9/1986 | Banfi | 335/16 |
| 4,612,430 | 9/1986 | Sloan et al. | 200/327 |
| 4,616,198 | 10/1986 | Pardini | 335/16 |
| 4,622,444 | 11/1986 | Kandatsu et al. | 200/303 |
| 4,631,625 | 12/1986 | Alexander et al. | 361/94 |
| 4,642,431 | 2/1987 | Tedesco et al. | 200/153 G |
| 4,644,438 | 2/1987 | Puccinelli et al. | 361/75 |
| 4,649,247 | 3/1987 | Preuss et al. | 200/244 |
| 4,658,322 | 4/1987 | Rivera | 361/37 |
| 4,672,501 | 6/1987 | Bilac et al. | 361/96 |
| 4,675,481 | 6/1987 | Markowski et al. | 200/144 R |
| 4,682,264 | 7/1987 | Demeyer | 361/96 |
| 4,689,712 | 8/1987 | Demeyer | 361/96 |
| 4,694,373 | 9/1987 | Demeyer | 361/96 |
| 4,710,845 | 12/1987 | Demeyer | 361/96 |
| 4,713,718 * | 12/1987 | Quayle | 361/29 |
| 4,717,985 | 1/1988 | Demeyer | 361/96 |
| 4,733,211 | 3/1988 | Castonguay et al. | 335/192 |
| 4,733,321 | 3/1988 | Lindeperg | 361/96 |
| 4,743,816 * | 5/1988 | Prather | 318/455 |
| 4,743,818 * | 5/1988 | Quayle et al. | 318/473 |
| 4,757,242 * | 7/1988 | Prather | 318/473 |
| 4,764,650 | 8/1988 | Bur et al. | 200/153 G |
| 4,768,007 | 8/1988 | Mertz et al. | 335/202 |
| 4,780,786 | 10/1988 | Weynachter et al. | 361/87 |
| 4,831,221 | 5/1989 | Yu et al. | 200/553 |
| 4,870,531 | 9/1989 | Danek | 361/93 |
| 4,883,931 | 11/1989 | Batteux et al. | 200/148 R |
| 4,884,047 | 11/1989 | Baginski et al. | 335/10 |
| 4,884,164 | 11/1989 | Dziura et al. | 361/97 |
| 4,900,882 | 2/1990 | Bernard et al. | 200/147 R |
| 4,910,485 | 3/1990 | Bolongeat-Mobleu et al. | 335/195 |
| 4,914,541 | 4/1990 | Tripodi et al. | 361/94 |
| 4,916,420 | 4/1990 | Bartolo et al. | 335/172 |
| 4,916,421 | 4/1990 | Pardini et al. | 335/185 |
| 4,926,282 | 5/1990 | McGhie | 361/102 |
| 4,935,590 | 6/1990 | Malkin et al. | 200/148 A |
| 4,937,706 | 6/1990 | Schueller et al. | 361/396 |
| 4,939,492 | 7/1990 | Raso et al. | 335/42 |
| 4,943,691 | 7/1990 | Mertz et al. | 200/151 |
| 4,943,888 | 7/1990 | Jacob et al. | 361/96 |
| 4,950,855 | 8/1990 | Bolonegeat-Mobleu et al. | 200/148 A |
| 4,951,019 | 8/1990 | Gula | 335/166 |
| 4,952,897 | 8/1990 | Barnel et al. | 335/147 |
| 4,958,135 | 9/1990 | Baginski et al. | 335/8 |
| 4,965,543 | 10/1990 | Batteux | 335/174 |
| 4,983,788 | 1/1991 | Pardini | 200/16 R |
| 5,001,313 | 3/1991 | Leclerq et al. | 200/148 B |
| 5,004,878 | 4/1991 | Seymour et al. | 200/144 R |
| 5,029,301 | 7/1991 | Nebon et al. | 335/16 |
| 5,030,804 | 7/1991 | Abri | 200/323 |
| 5,057,655 | 10/1991 | Kersusan et al. | 200/148 B |
| 5,077,627 | 12/1991 | Fraisse | 361/93 |
| 5,083,081 | 1/1992 | Barrault et al. | 324/126 |
| 5,095,183 | 3/1992 | Raphard et al. | 200/148 A |
| 5,103,198 | 4/1992 | Morel et al. | 335/6 |
| 5,115,371 | 5/1992 | Tripodi | 361/106 |
| 5,120,921 | 6/1992 | DiMarco et al. | 200/401 |
| 5,132,865 | 7/1992 | Mertz et al. | 361/6 |
| 5,138,121 | 8/1992 | Streich et al. | 200/293 |
| 5,140,115 | 8/1992 | Morris | 200/308 |
| 5,153,802 | 10/1992 | Mertz et al. | 361/18 |
| 5,155,315 | 10/1992 | Malkin et al. | 200/148 R |
| 5,166,483 | 11/1992 | Kersusan et al. | 200/144 A |
| 5,172,087 | 12/1992 | Castonguay et al. | 335/160 |
| 5,178,504 | 1/1993 | Falchi | 411/553 |
| 5,184,717 | 2/1993 | Chou et al. | 200/401 |
| 5,187,339 | 2/1993 | Lissandrin | 200/148 F |
| 5,198,956 | 3/1993 | Dvorak | 361/106 |
| 5,200,724 | 4/1993 | Gula et al. | 335/166 |
| 5,210,385 | 5/1993 | Morel et al. | 200/146 R |
| 5,239,150 | 8/1993 | Bolongeat-Mobleu et al. | 200/148 R |
| 5,260,533 | 11/1993 | Livesey et al. | 200/401 |
| 5,262,744 | 11/1993 | Arnold et al. | 335/8 |
| 5,280,144 | 1/1994 | Bolongeat-Mobleu et al. | 200/148 R |
| 5,281,776 | 1/1994 | Morel et al. | 200/144 |
| 5,296,660 | 3/1994 | Morel et al. | 200/146 R |
| 5,296,664 | 3/1994 | Crookston et al. | 200/401 |
| 5,298,874 | 3/1994 | Morel et al. | 335/8 |
| 5,300,907 | 4/1994 | Nereau et al. | 335/172 |
| 5,310,971 | 5/1994 | Vial et al. | 200/244 |
| 5,313,180 | 5/1994 | Vial et al. | 335/16 |
| 5,317,471 | 5/1994 | Izoard et al. | 361/105 |
| 5,331,500 | 7/1994 | Corcoles et al. | 361/93 |
| 5,334,808 | 8/1994 | Bur et al. | 200/50 |
| 5,341,191 | 8/1994 | Crookston et al. | 335/16 |
| 5,347,096 | 9/1994 | Bolongeat-Mobleu et al. | 200/148 B |
| 5,347,097 | 9/1994 | Bolongeat-Mobleu et al. | 200/148 B |
| 5,350,892 | 9/1994 | Rozier | 200/144 B |
| 5,357,066 | 10/1994 | Morel et al. | 200/17 R |
| 5,357,068 | 10/1994 | Rozier | 200/148 R |
| 5,357,394 | 10/1994 | Piney | 361/72 |
| 5,361,052 | 11/1994 | Ferullo et al. | 335/172 |
| 5,373,130 | 12/1994 | Barrault et al. | 200/147 R |
| 5,379,013 | 1/1995 | Coudert | 335/17 |
| 5,424,701 | 6/1995 | Castonguary et al. | 335/172 |
| 5,438,176 | 8/1995 | Bonnardel et al. | 200/400 |
| 5,440,088 | 8/1995 | Coudert et al. | 200/303 |
| 5,449,871 | 9/1995 | Batteux et al. | 200/401 |
| 5,450,048 | 9/1995 | Leger et al. | 335/132 |
| 5,451,729 | 9/1995 | Onderka et al. | 200/18 |
| 5,452,201 * | 9/1995 | Pieronek et al. | 364/188 |
| 5,457,295 | 10/1995 | Tanibe et al. | 200/293 |

| | | | | | |
|---|---|---|---|---|---|
| 5,467,069 | 11/1995 | Payet-Burin et al. ............... 335/42 | 0 313 106 | 4/1989 | (EP) . |
| 5,469,121 | 11/1995 | Payet-Burin ............... 335/16 | 0 313 422 | 4/1989 | (EP) . |
| 5,475,558 | 12/1995 | Barjonnet et al. ............... 361/64 | 0 314 540 | 5/1989 | (EP) . |
| 5,477,016 | 12/1995 | Baginski et al. ............... 200/43.11 | 0 331 586 | 9/1989 | (EP) . |
| 5,479,143 | 12/1995 | Payet-Burin ............... 335/202 | 0 337 900 | 10/1989 | (EP) . |
| 5,483,212 | 1/1996 | Lankuttis et al. ............... 335/132 | 0 342 133 | 11/1989 | (EP) . |
| 5,485,343 | 1/1996 | Santos et al. ............... 361/115 | 0 367 690 | 5/1990 | (EP) . |
| 5,493,083 | 2/1996 | Olivier ............... 200/17 R | 0 371 887 | 6/1990 | (EP) . |
| 5,493,468 * | 2/1996 | Hunter et al. ............... 361/31 | 0 375 568 | 6/1990 | (EP) . |
| 5,504,284 | 4/1996 | Lazareth et al. ............... 200/50 R | 0 394 144 | 10/1990 | (EP) . |
| 5,504,290 | 4/1996 | Baginski et al. ............... 200/401 | 0 394 922 | 10/1990 | (EP) . |
| 5,510,761 | 4/1996 | Boder et al. ............... 335/172 | 0 399 282 | 11/1990 | (EP) . |
| 5,512,720 | 4/1996 | Coudert et al. ............... 200/400 | 0 407 310 | 1/1991 | (EP) . |
| 5,515,018 | 5/1996 | DiMarco et al. ............... 335/16 | 0 452 230 | 10/1991 | (EP) . |
| 5,519,561 | 5/1996 | Mrenna et al. ............... 361/105 | 0 555 158 | 8/1993 | (EP) . |
| 5,530,643 * | 6/1996 | Hodorowski ............... 364/191 | 0 560 697 | 9/1993 | (EP) . |
| 5,534,674 | 7/1996 | Steffens ............... 218/154 | 0 567 416 | 10/1993 | (EP) . |
| 5,534,832 | 7/1996 | Duchemin et al. ............... 335/16 | 0 595 730 | 5/1994 | (EP) . |
| 5,534,835 | 7/1996 | McColloch et al. ............... 335/172 | 0 619 591 | 10/1994 | (EP) . |
| 5,534,840 | 7/1996 | Cuingnet ............... 337/1 | 0 665 569 | 8/1995 | (EP) . |
| 5,539,168 | 7/1996 | Linzenich ............... 200/303 | 0 700 140 | 3/1996 | (EP) . |
| 5,543,595 | 8/1996 | Mader et al. ............... 200/401 | 0 889 498 | 1/1999 | (EP) . |
| 5,552,755 | 9/1996 | Fello et al. ............... 335/18 | 2 410 353 | 6/1979 | (FR) . |
| 5,581,219 | 12/1996 | Nozawa et al. ............... 335/132 | 2 512 582 | 3/1983 | (FR) . |
| 5,596,473 * | 1/1997 | Johnson et al. ............... 361/97 | 2 553 943 | 4/1985 | (FR) . |
| 5,604,656 | 2/1997 | Derrick et al. ............... 361/187 | 2 592 998 | 7/1987 | (FR) . |
| 5,608,367 | 3/1997 | Zoller et al. ............... 335/132 | 2 682 531 | 4/1993 | (FR) . |
| 5,610,579 * | 3/1997 | Early et al. ............... 340/517 | 2 697 670 | 5/1994 | (FR) . |
| 5,706,153 * | 1/1998 | Innes et al. ............... 361/31 | 2 699 324 | 6/1994 | (FR) . |
| 5,764,023 * | 6/1998 | Wieloch ............... 318/803 | 2 714 771 | 7/1995 | (FR) . |
| 5,784,233 | 7/1998 | Bastard et al. ............... 361/36 | 2 233 155 | 1/1991 | (GB) . |
| 6,005,757 * | 12/1999 | Shvach et al. ............... 361/64 | 1 227 978 | 5/1986 | (RU) . |
| 6,032,203 * | 2/2000 | Heidhues ............... 710/11 | 92/00598 | 1/1992 | (WO) . |
| | | | 92/05649 | 4/1992 | (WO) . |
| | | | 94/00901 | 1/1994 | (WO) . |

FOREIGN PATENT DOCUMENTS 0 295 158  12/1988 (EP) .
0 309 923  4/1989 (EP) .

* cited by examiner

BREAKER/STARTER WITH AUTO-CONFIGURABLE TRIP UNIT

CROSS REFERENCE TO RELATED APPLICATION

This is related to U.S. patent application Ser. No. 09/375,694 entitled Small-Sized Industrial Rated Electric Motor Starter Switch Unit filed concurrently herewith which is incorporated herein by reference.

BACKGROUND OF THE INVENTION

The present invention relates to an integrated circuit breaker/starter for a motor.

In the field of motor control, it is known to control the operation of a motor (e.g., to start or stop the motor) using a contactor, which is a three pole switch which is electrically operated by a (usually) continuously energized solenoid operating coil. It is also known to provide thermal protection, i.e., overload protection, to a motor against overload conditions using a motor overload relay. Overload conditions occur when equipment is operated in an electrically undamaged circuit in excess of normal full-load rating, or when conductors carry current in excess of rated ampacity. Overload conditions persisting for a sufficient length of time will damage or overheat the equipment. Overload conditions do not include faults which require instantaneous protection such as a short circuit or ground fault or a loss of a phase. The terms "overload," "overload protection" and "overload relay" are defined in the National Electrical Manufacturers Association (NEMA) standard ICS2, which is herein incorporated by reference. Typical overload relays have been implemented using bimetal relays, and more recently using electronics and current transformer sensors. A conventional motor starter is typically implemented by a combination of a contactor and a motor overload relay.

Overload conditions result in a cumulative heating effect in motor circuits, and subsequently a cooling effect after the motor circuit is deenergized, such as with an overload relay. Therefore, the length of time that a motor can operate before overheating under overload conditions will vary if the motor is energized and deenergized too frequently. This cumulative heating and cooling effect is known as thermal memory, i.e., operating memory as defined in NEMA standard ICS2.

Typical overload relays, such as bimetal relays, compensate for thermal memory of the motor mechanically through the thermal memory of the bimetal components within the relays themselves. However, thermal memory, i.e., the cumulative heating and cooling effect, changes between motor applications. Therefore, a bimetal relay must be matched to a particular motor and cannot be used to provide overload protection for more than one motor application.

Electronic devices, e.g., electronic overload relays or electronic trip units, can compensate for thermal memory through software algorithms. The algorithms have adjustable parameters that can be changed from one motor application to another. However, unlike the bimetal relays, the ability to compensate for thermal memory is lost in prior art electronic devices when power is interrupted.

To protect an electrical motor from electrical overload conditions, it is known to use a circuit breaker in combination with a motor starter. Motor control centers and combination starter panels both use motor combination starters. There are typically two types of circuit breakers used in motor starter applications. The first is an "inverse time" general circuit breaker, and the second (more common) type is the "instantaneous trip" only circuit breaker, which provide instantaneous protection from faults such as short circuits, ground faults or a loss of a phase. The instantaneous trip circuit breaker is more typically used in motor applications due to cost considerations, and because the use of an inverse time circuit breaker provides more protection than is typically needed. Further, inverse time circuit breakers are not typically configured for motor protection, as motor protection requires different trip times than typical circuit breaker applications.

A typical motor application circuit is shown in FIG. 1. The circuit is connected between lines L1 and L2 and includes a normally-closed stop switch 10, a normally-open start switch 12, a contactor coil 14, and a conventional overload relay 15. The contactor coil 14 is energized or de-energized appropriately to operate contactors in a three-phase system, where each of three phase lines A, B, and C has a circuit breaker 16a, 16b, and 16c, respectively, contactors 14a, 14b, and 14c, respectively, and motor overload protection 18a, 18b, and 18c, respectively. The circuit breakers 16a, 16b, and 16c are typically implemented by instantaneous trip circuit breakers.

It would be desirable to consolidate the circuit breaker instantaneous trip with a motor starter overload protection. It would also be desirable to be able to vary or reconfigure the circuit breaker trip time for different motor applications. It would further be desirable to prevent the circuit breaker from tripping during a motor overload condition and to be able to provide a substantially continuous power supply to the motor electronics so that the occurrence of an overload condition and thermal memory can be remembered.

SUMMARY OF THE INVENTION

The present invention overcomes the problems described above, and achieves additional advantages, by providing for an integrated circuit breaker/motor starter which includes a controller or contactor arranged to control an electrical motor, and a motor overload relay/trip unit for providing thermal protection for the electrical motor, the overload relay being connected to the controller or contactor and being capable of receiving at least one removably connectable contactor module. The contactor module can be a circuit breaker, and can be encoded such that the connection of the module will provide an indication to the controller of desired trip time configuration. Thus, numerous module types can be readily connected or disconnected from the starter to adapt the integrated starter/breaker to a variety of motor control applications.

BRIEF DESCRIPTION OF THE DRAWINGS

The present invention can be more fully understood by reading the following Detailed Description, which describes specific implementations of the invention, in conjunction with the accompanying drawings, in which.

DETAILED DESCRIPTION

Figure 2:
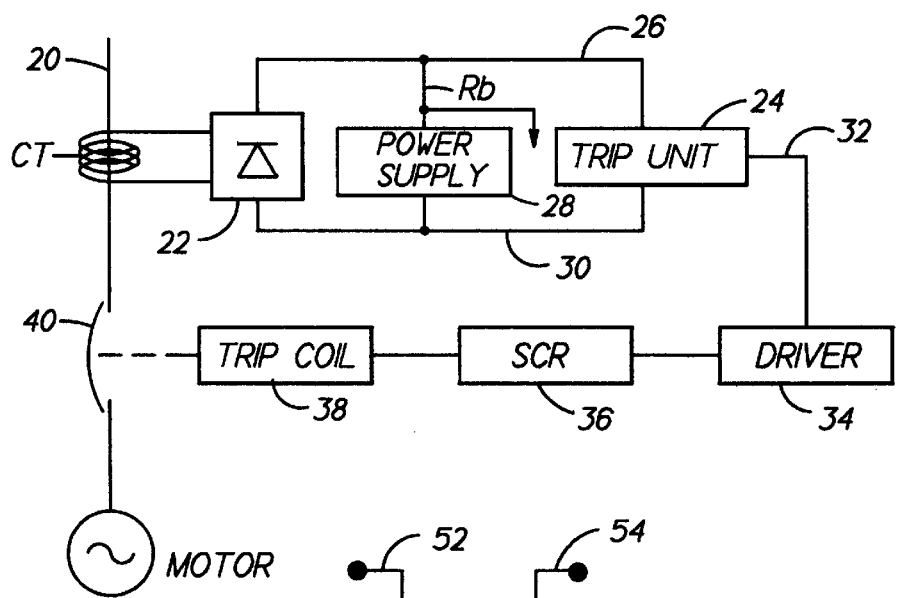
FIG. 2 is a diagram of a conventional circuit breaker.

Referring now to FIG. 2, a known circuit breaker for use with the integrated breaker/starter of the present invention is shown. It should be appreciated that the circuit shown in FIG. 2 is a single line diagram of the circuit breaker shown and described in U.S. Pat. No. 4,589,052. In the circuit breaker of FIG. 2, conductor 20 is sensed by means of current transformer CT which provides a current value which is rectified within rectifier 22. A voltage value indicative of the composite current is developed across a burden resistor Rb which is inputted to the integrated circuit trip unit 24 by means of negative bus 26. A power supply 28 connecting between ground and the positive bus 30 receives its operating power from the same current transformers. When a trip output signal is generated within trip unit 24 a control signal is sent over line 32 to a driver circuit 34 for gating an SCR 36 which allows operating current to flow through the flux-shift trip coil 38 thereby tripping the circuit breakers 40. The integrated circuit trip unit or "chip" 24 is a 40-pin very large scale integration (VLSI) implementation. A plurality of digital switches (not shown) can be used for setting the various interrupting levels and time delays as well as the various options available within the chip 24. The interrupting levels can include the adjustable current setting, which varies the level of current the breaker will carry indefinitely without tripping, the long time (LT) overcurrent "pickup" value, the short time (ST) pickup value, ground fault pickup value and instantaneous pickup value. It should be appreciated that numerous other details of the operation are disclosed in U.S. Pat. No. 4,589,052, the entirety of which is incorporated by reference.

Figure 3:
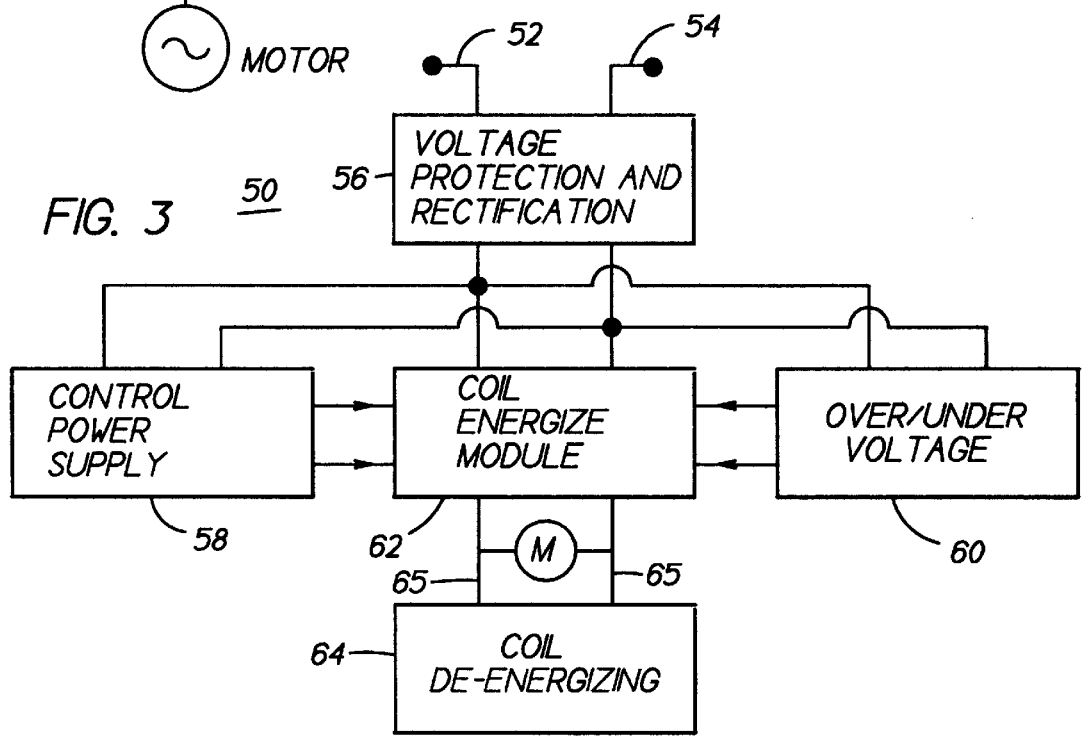
FIG. 3 is a block diagram of a removably connectable contactor module according to an embodiment of the present invention.

Referring now to FIG. 3, a block diagram of a removably connectable contactor module according to an embodiment of the present invention is shown. The contactor module 50 is connected between terminals 52 and 54, and includes a voltage protection and rectification module 56, a control power supply module 58, and an over/under voltage module 60, each of which is connected to each of the others via a bidirectional link. The contactor module further includes a coil energizing module 62 which is connected between the power supply module 58 and the over/under voltage module 60, and the module 62 receives input from each of the module 58 and 60 over unidirectional links as shown. The contactor module further includes a coil-deenergizing module 64 which is connected by two conductors 65 to the coil energizing module 62. A contactor coil 14 is connected between the conductors 65. The coil energizing module controls the energizing of the coil 14, and the coil de-energizing module controls the de-energizing of the coil 66. The coil energizing module 62 includes an oscillator, a current level comparator, an energizing signal generator, and a single shot generator. While these elements are not explicitly shown in FIG. 3, they are generally well-known in the art.

Figure 1:
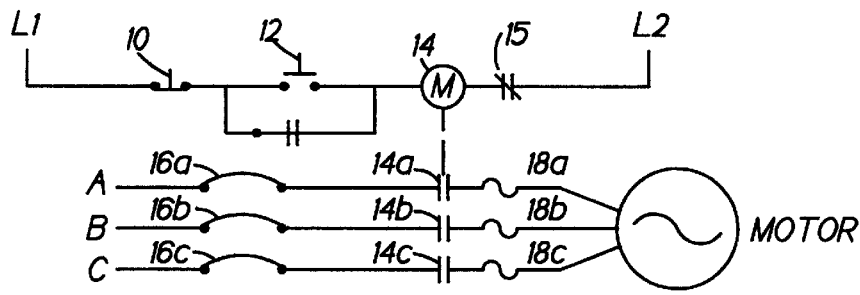
FIG. 1 is a diagram of a conventional motor control circuit.
Figure 4:
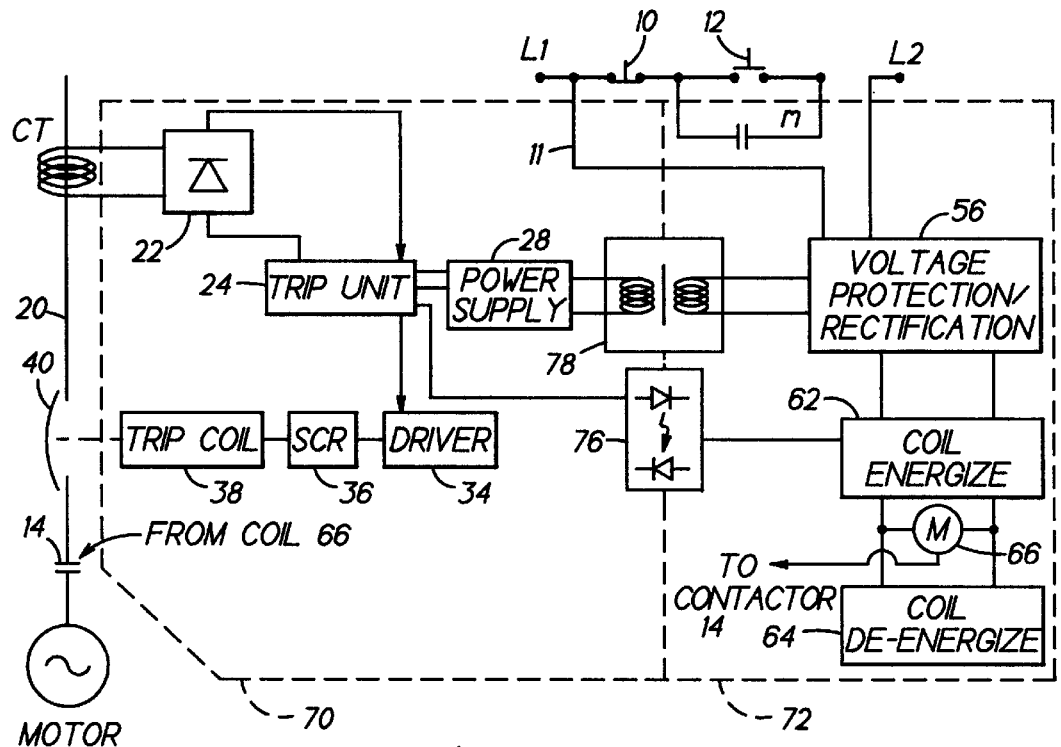
FIG. 4 is a block diagram of an integrated breaker/starter according to an embodiment of the present invention.

Referring now to FIG. 4, a block diagram of an integrated breaker/starter according to an embodiment of the present invention is shown. In this embodiment, the power supplies (28, 58) and operating systems (of the trip unit and of the module) are isolated. In this embodiment, the integrated breaker/starter includes a circuit breaker portion 70, which is substantially similar to the circuit breaker shown and described with respect to FIG. 2, and an add on contactor module portion 72, which is substantially similar to the module embodiment shown and described with respect to FIG. 3, with the exception that the power supply 58 and over/under voltage module 60 of the module of FIG. 3 have been omitted for ease of illustration. It should be appreciated that the module 72 substantially replaces the coil 14 and conventional overload relay 15 of FIG. 1. The portions 70 and 72 are connected by an opto-isolator 76 and isolation transformer 78. The voltage protection and rectification module 56 is connected between the start switch 12, located on a first line L1, and an output line L2. Lines L1 and L2 are connected to an incoming control voltage, fed from a control power transformer (CPT) or alternative power source, at a voltage which is typically 120 volts but can range up to approximately 600 volts. It should be noted that a conductor 11 converts line L1 directly to the voltage protection/rectification module 56, such that the module 56 receives a voltage supply after the stop switch 10 is operated. The contactor coil 66 is energized or de-energized as appropriate to operate the contactors 14.

In operation, the current through the line 20 connected to the motor is sensed by current transformer CT, is rectified by rectifier 22, and the rectified output (a DC voltage) is provided to trip unit 24. The detected voltage (i.e., the rectified output) is compared (e.g., in a comparator associated with the trip unit) to a predetermined threshold to determined whether a short circuit, motor overload, or other predetermined condition has occurred. In the event of a short circuit condition, the trip unit acts in a conventional manner (e.g., as described with respect to FIG. 2) to provide a trip signal through driver 34, SCR 36, and trip coil 38 to cause the circuit breaker to trip. When the contactor module 72 is turned on, a pulse width modulator (PWM; not shown) is turned on for a time period determined by a single shot timer (not shown). This causes an energizing control signal to be provided to the coil energizing module 62 through the opto-isolator to energize the coil 66 at an initial inrush current level. Upon the expiration of the time period set by the single shot timer, the energizing current is reduced to a holding current level which keeps the circuit sealed. In response to the detection of an overload condition (based on the output of the comparison described above), the pulse width modulator is turned off, and the coil 66 is de-energized. It should be appreciated that if the circuit breaker 40 is tripped, the power will be removed from the control electronics, and that during a motor overload condition, the circuit breaker will not trip. In both situations, the power supply 28 supplies power to the control electronics substantially without interruption via L1 and L2, and voltage protection/rectification module 56, so that the electronics can remember that a motor overload condition occurred even when power is interrupted. Therefore the overload protection can provide thermal memory. By not tripping the circuit breaker during a motor overload condition, the present invention can advantageously and effectively provide both motor overload and short circuit protection in an integrated circuit breaker/motor starter.

Figure 5:
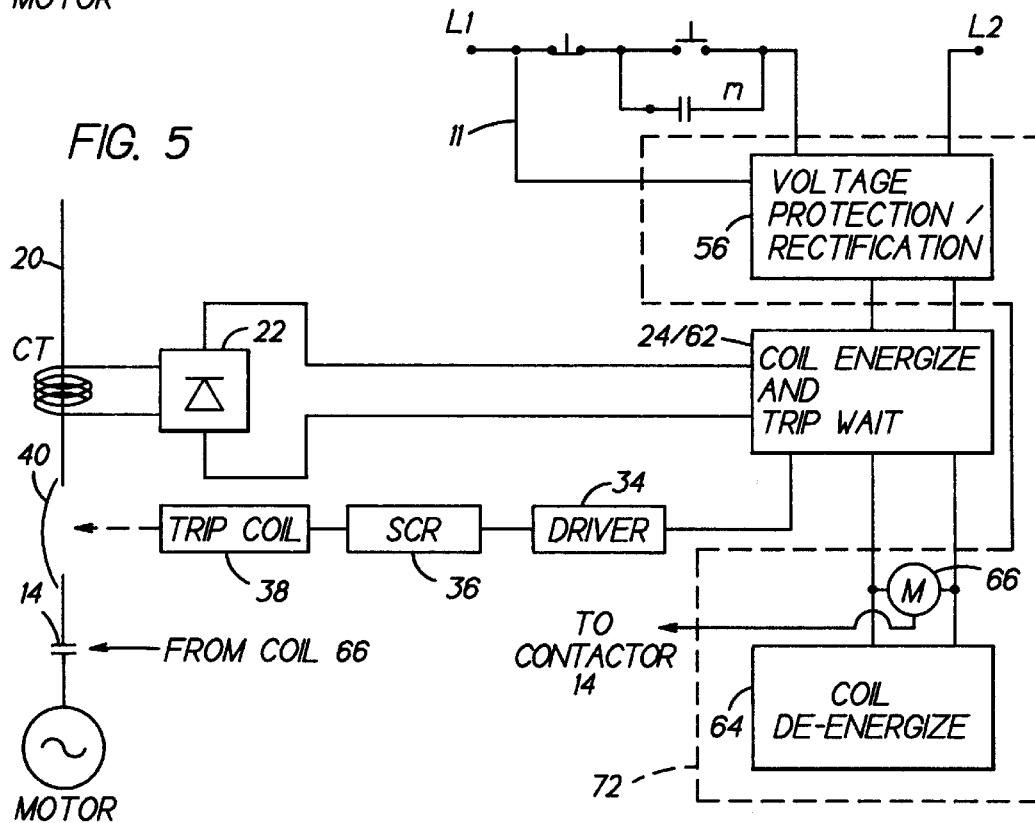
FIG. 5 is a block diagram of a breaker/starter according to an alternative embodiment of the present invention.

Referring now to FIG. 5, a block diagram of an alternative embodiment of the present invention is shown, in which the power supplies and operating systems are not isolated. In this embodiment, the coil energizing module 24/62, in addition to having the functions of the coil energizing module 62 of FIG. 4, is further provided with the functions of the circuit breaker/overload trip unit 24 of FIG. 4. Thus, in the module 24/62 of FIG. 5, there is provided a full circuit breaker trip unit, an internal overload trip means for controlling the contactor coil, and a coil energizing system including a current level comparator, oscillator, energizing signal generator, and a single shot generator.

Figure 6:
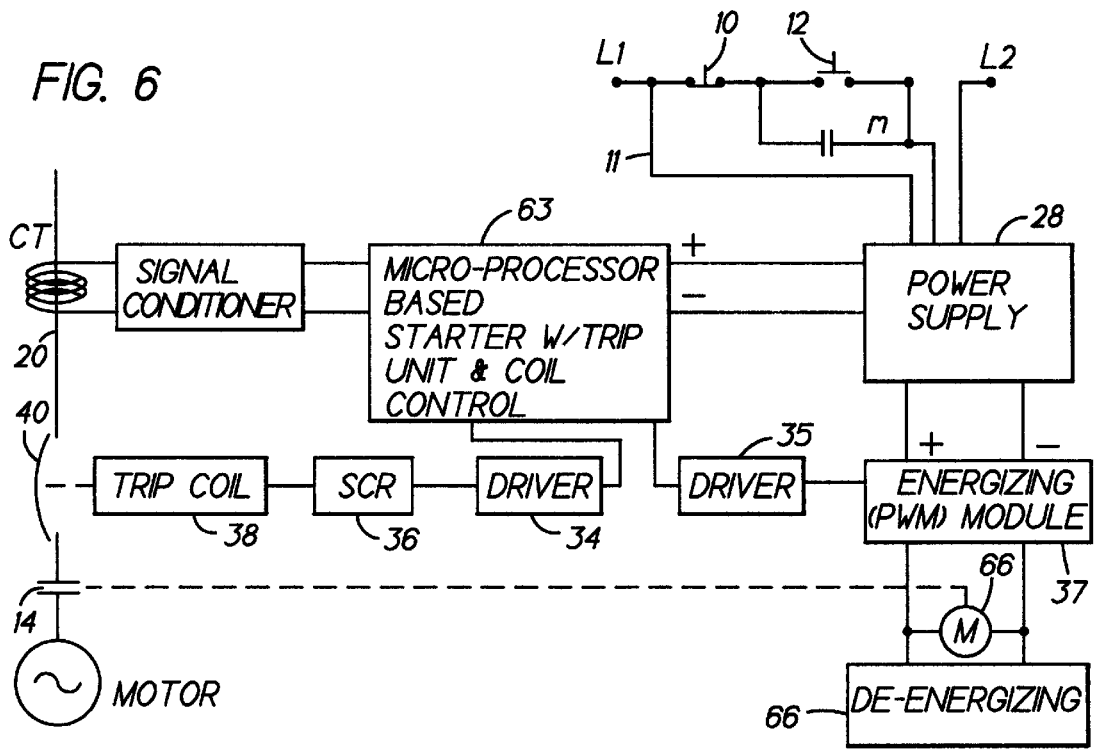
FIG. 6 is an alternative arrangement of the breaker/starter of FIG. 5.

An alternative arrangement is shown in FIG. 6, and can be implemented by replacing module 24/62 with a microprocessor based combination motor starter module 63 having a trip unit and a coil control unit. The trip unit 63 in this alternative embodiment preferably has two independent outputs to breaker and contactor for instantaneous trip (via elements 34, 36, and 38) and overload trip (via a driver 35 and a pulse width modulator module 37 connected between the power supply 28 and the coil and de-energizing modules 66, respectively). The trip unit 63 also preferably includes phase loss protection and an external power supply to provide thermal memory for proper overload protection. The coil control portion preferably performs full contactor coil control (i.e., over/under voltage), an oscillator, a current level comparator, an energizing signal generator, and a single shot generator.

Figure 7:
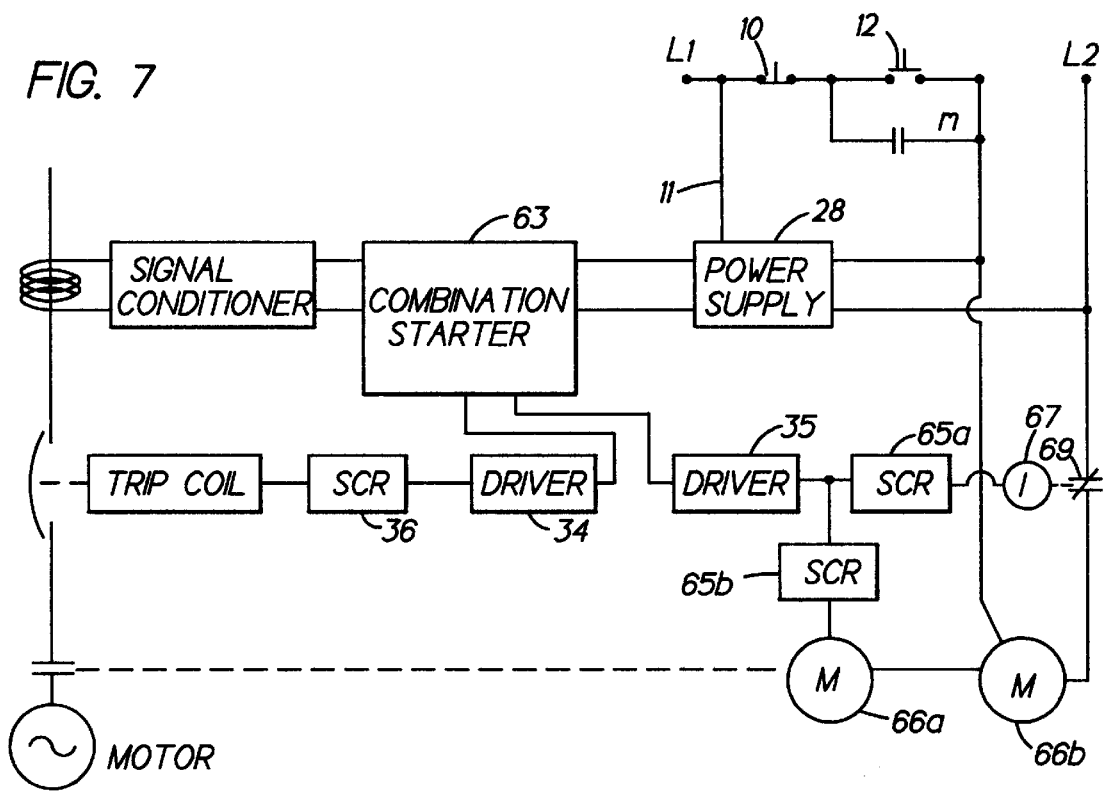
FIG. 7 is another alternative arrangement of the breaker/starter of FIG. 5.

Still another alternative arrangement is shown in FIG. 7. In this alternative, an integrated breaker/starter scheme without isolation is shown, with a relay scheme, including multiple coils 66a, 66b, multiple SCRs 65a, 65b, relay coil 67 and relay 69 substantially replacing the PWM module and de-energizing module 37 of FIG. 6. The microprocessor-based combination starter module 63 is substantially the same as in FIG. 6.

Figure 8:
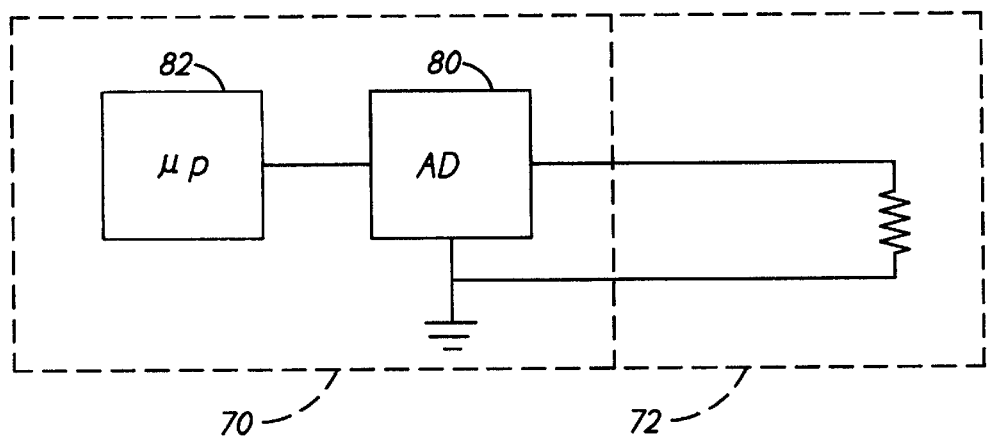
FIG. 8 is a simplified diagram of a first connection scheme suitable for use with the present invention.

Referring to FIGS. 4 & 5, it will be appreciated that the electronic trip unit 24 contained in the main circuit breaker unit initiates the operation of both the circuit breaker 40 and the contactor 14, but that operation of the contactor 14 is performed by the add-on module 72. Thus, the trip unit 24 must be approximately configured to initiate operation of the contactor 14 according to the desired application. Referring now to FIG. 8, a simplified block diagram of a first exemplary connection scheme for the trip unit module 70 and an add-on module 14. In the embodiment of FIG. 8, the trip unit module 70 includes an A/D converter 80 which connects with the add-on module 72. One suitable A/D converter is described in U.S. Pat. No. 4,589,052. The A/D converter converts a coded signal provided by the add-on module 72 to a digital output identification signal, and provides this output signal to microprocessor 82 (contained within the circuit breaker trip unit). The microprocessor 82 receives the digitized identification signal from the A/D converter, and performs a configuration sequence and automatic configuration routine and determines the appropriate trip time for the circuit breaker and other circuit parameters. In this matter, the trip point can be automatically reconfigured for a wide variety of applications.

Figure 9:
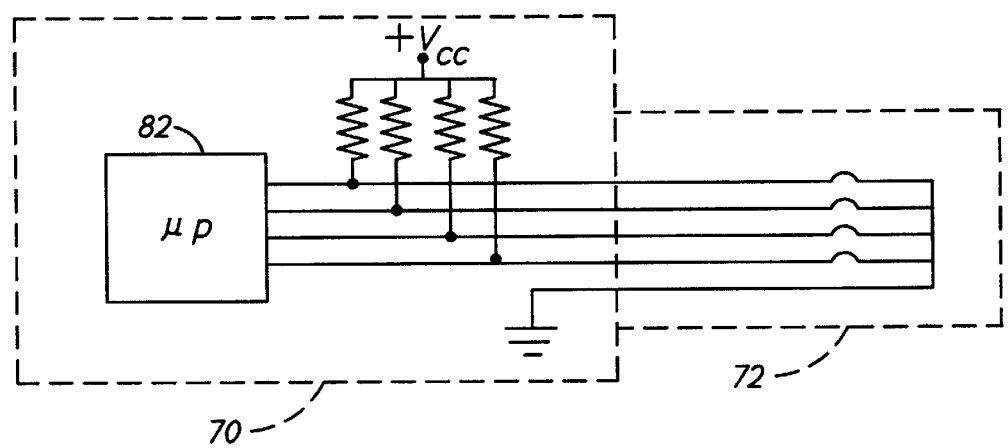
FIG. 9 is a simplified block diagram of a second connection scheme suitable for use with the present invention.

Referring now to FIG. 9 a simplified block diagram of a second exemplary connection scheme for the trip unit module 70 and add-on module 72. In the embodiment of FIG. 9, the A/D converter of FIG. 8 has been replaced by a plurality of connections directly between the add-on module 72 and the trip unit module 70. It should be appreciated that the connection scheme of FIG. 8 accommodates a relatively large number of possible connection combinations, but can add to the complexity and cost of the trip unit if there is no spare analog/digital converter associated with the microprocessor. In contrast, the connection scheme of FIG. 9 is relatively simpler and cheaper, but requires the use of multiple microprocessor input/output lines.

It should be appreciated that while the invention has been described using a removably connectable contactor module, the present invention can accommodate any of number of removably connectable modules, connected as shown and described with respect to FIGS. 8–9. In each case, the connectable modules are encoded or identified such that when the module is connected to the trip unit module, the microprocessor associated with the trip unit module can determine the appropriate trip times, contactor coil pickup and hold current, and other parameters which are specific to a particular application.

Figure 10:
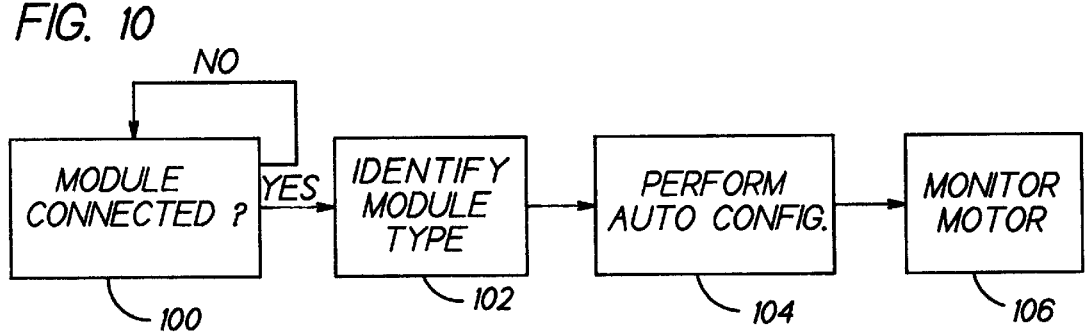
FIG. 10 is a flow chart showing the steps of a method for providing integrated circuit breaker/motor starter protection according to a first embodiment of the present invention.

FIG. 10 is a flow chart describing the steps for providing circuit breaker and motor starter protection according to one embodiment of the present invention. In step 100, a suitably programmed microprocessor associated with a circuit breaker determines that a removably connectable module has been connected to the circuit breaker unit. In step 102, the microprocessor determines (e.g., from identification coding contained in the removably connectable module) the type of connectable module and/or appropriate configuration parameters (e.g., circuit breaker trip time, contactor coil closing time, contactor coil pickup and hold current, etc.) for the particular connectable module. In step 104, the microprocessor runs an automatic configuration routine based on the information determined in step 102 to automatically configure the trip times and other configuration parameters. In step 106, the circuit breaker monitors motor current to determine whether a predetermined condition (e.g., a short circuit condition or a motor overload condition) has occurred. If a predetermined condition occurs, the microprocessor automatically initiates the appropriate remedial action. For a short circuit condition, the microprocessor will output a control signal to cause the circuit breaker to trip, and for a motor overload condition (assuming the connectable module is a contactor module), the microprocessor will output a control signal to cause the contactor coil to be de-energized to open the contactor. For a different application, the connectable module can be removed and replaced with a different module, and the microprocessor will automatically reconfigure the parameters for the new application.

Figure 11:
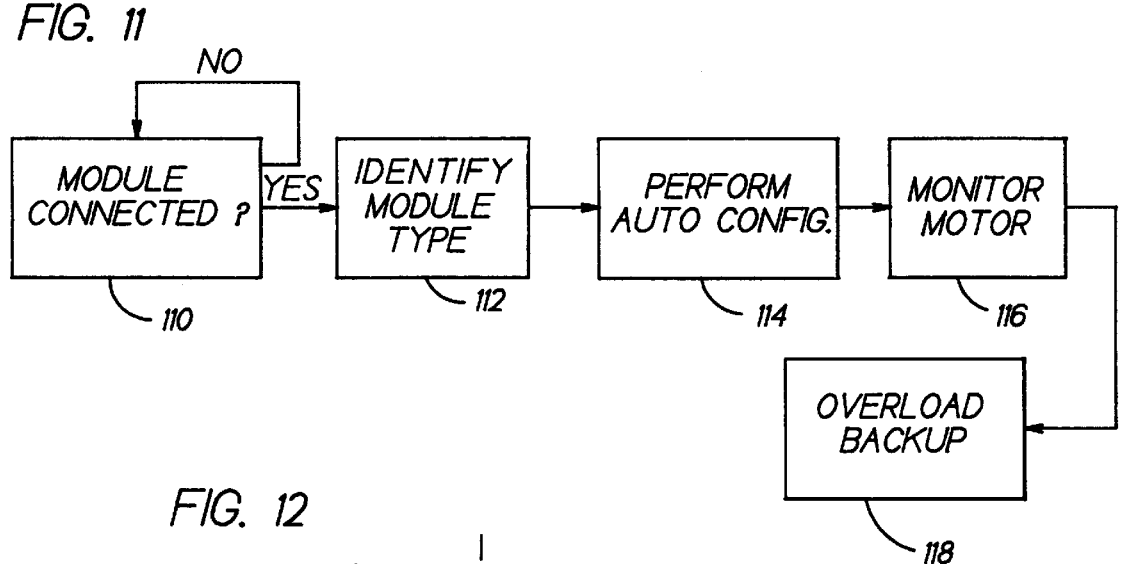
FIG. 11 is a flow chart showing the steps of a method for providing integrated circuit breaker/motor starter protection according to a second embodiment of the present invention.

FIG. 11 is a flow chart describing the steps for providing circuit breaker and motor starter protection according to another embodiment of the present invention. In step 110, a suitably programmed microprocessor associated with a circuit breaker determines that a removably connectable module has been connected to the circuit breaker unit. In step 112, the microprocessor determines (e.g., from identification coding contained in the removably connectable module) the type of connectable module and/or appropriate configuration parameters (e.g., circuit breaker trip time, contactor coil closing time, contactor coil pickup and hold current, etc.) for the particular connectable module. In step 114, the microprocessor runs an automatic configuration routine based on the information determined in step 112 to automatically configure the trip times and other configuration parameters. In step 116, the circuit breaker monitors motor current to determine whether a predetermined condition (e.g., a short circuit condition or a motor overload condition) has occurred. In step 118, the microprocessor provides a trip signal to breaker as a system backup in event of an overload trip via a contactor malfunction. This backup overload breaker trip function sets up the electronic trip unit to provide backup overload protection. This backup function trips the breaker in the event the overload trip fails and the breaker still detects that an overload current is still flowing. At a specific point later in the cycle, this fault system allows sufficient time for the primary trip means to react. This fault function is configured within the programming of the microprocessor to provide the backup overload trip function. If a predetermined condition occurs, the microprocessor automatically initiates the appropriate remedial action. For a short circuit condition, the microprocessor will output a control signal to cause the circuit breaker to trip, and for a motor overload condition (assuming the connectable module is a contactor module), the microprocessor will output a control signal to cause the contactor coil to be de-energized to open the contactor.

Figure 12:
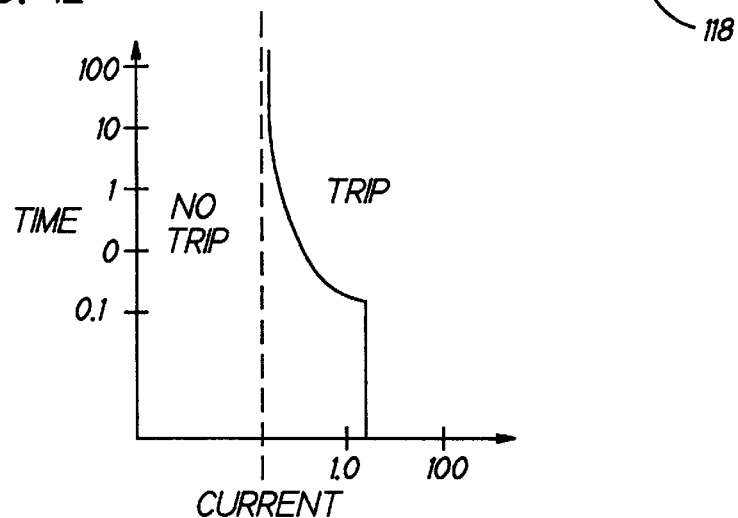
FIG. 12 is a trip time curve for a standard inverse time breaker configuration.
Figure 13:
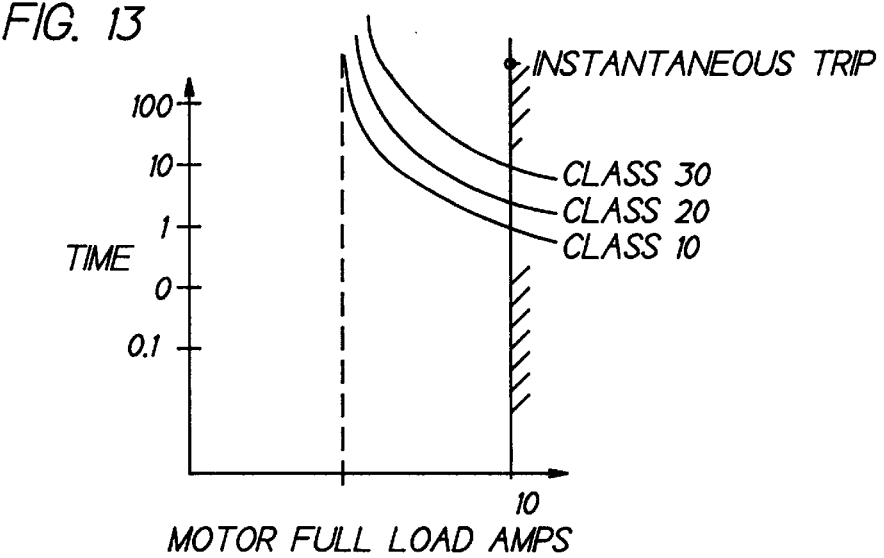
FIG. 13 shows selectable trip time curves for a motor configuration according to an aspect of the present invention.

Referring now to FIGS. 12 and 13, trip time curves of a standard inverse time breaker configuration, and a motor configuration are shown. As will be apparent from FIG. 13, the motor overload trip times according to embodiments of the present invention are selectable between e.g., class 10, class 20, and class 30.

While the exemplary embodiments have been described assuming a contactor add-on module, it should be emphasized that the invention offers a major benefit by accommodating many types of modules for many types of motor applications. In addition to National Electrical Manufacturer's Association (NEMA) or International Electro-Technical Commission (IEC) contactor modules, fused limiter modules (which respond to high short circuit, high current applications), enhanced trip unit modules (a higher level trip unit with metering functions), ground fault protection modules, and communication modules (for communicating motor information to a remote processor). The simple "plug and play" aspect of the present invention assures reliable operation and avoids use mistakes by automatically reconfiguring breaker/starter parameters for specific applications.

While the foregoing description includes numerous specific details, these details are for purposes of explanation only, and are not intended to limit the scope of the invention. The details and embodiments described above can be varied in many ways without departing from the spirit and scope of the invention, as defined by the following claims and their legal equivalents.

What is claimed is:

1. An electrical motor starter circuit, comprising:
   a trip unit connected so as to sense a current associated with an electrical motor and to operate an instantaneous trip circuit breaker associated with the electrical motor, the trip unit being capable of receiving at least one removably connectable module, the trip unit including a microprocessor; and
   at least one removably connected module connected to said trip unit for performing a motor starter function,
   wherein the microprocessor automatically determines, from the removably connectable module, one or more configuration parameters for the electrical motor, automatically adjusts the configuration parameters, and automatically provides control signals to perform at least two different control functions in the electrical motor,
   wherein said at least two control functions include a motor overload trip function and a circuit breaker trip function, and
   wherein said the circuit breaker trip function trips said instantaneous trip circuit breaker.

2. The circuit of claim 1, wherein the removably connectable module is a contactor module connected to receive at least one of the control signals and to control at least one contactor associated with the electrical motor as one of the two different control functions.

3. The circuit of claim 2, wherein the at least one contactor is operated when the sensed current exceeds a first threshold, and wherein the circuit breaker is operated when the sensed current exceeds a second threshold.

4. The circuit of claim 2 wherein the trip unit is connected so as to receive power from a power supply substantially continuously during circuit breaker operation and contactor operation.

5. The circuit of claim 1, wherein the configuration parameters include at least one of: circuit breaker trip time, contactor coil closing time, contactor coil holding time, contactor coil pickup current, contactor coil hold current.

6. The circuit of claim 1, wherein said removably connected module is connected to an analog-to-digital converter and is in communication with the microprocessor.

7. The circuit of claim 1, wherein said removably connected module is connected to the microprocessor via a plurality of input/output lines electrically connected to said microprocessor.

8. The circuit of claim 1, wherein the trip unit is connected so as to receive power from power supply substantially continuously during circuit breaker operation and module operation.

9. The circuit of claim 1, wherein the trip unit compensates for thermal memory of the motor.

10. The circuit of claim 1, wherein the overload breaker trip function fails and the breaker still detects an overload current, the trip function causes the breaker to trip at a predetermined point, allowing sufficient time for the breaker trip means to react.

11. A method for controlling operation of a motor in a circuit breaker trip unit, comprising:
   selecting configuration parameters for performing circuit breaker operation and operation of a contactor associated with the motor;
   automatically adjusting the configuration parameters based on said selecting;
   monitoring inputs to the microprocessor to determine whether a predetermined condition has occurred;
   performing one or more of said circuit breaker operation and said operation of at least one contactor when the predetermine condition has occurred, wherein said circuit breaker operation includes an instantaneous trip function.

12. The method of claim 11, wherein the configuration parameters include circuit breaker trip times.

13. The method of claim 11, wherein performing the operation of at least one contactor is performed by outputting a control signal to a coil energizing element, energizing a contactor coil in response to the control signal, and operating the contactor in response to the energizing of the contactor coil.

14. The method of claim 11, wherein the predetermined condition is a motor overload condition.

15. The method of claim 14 wherein an overload breaker trip function fails and a breaker still detects an overload current, causing a trip function of the breaker to trip at a predetermined point, allowing sufficient time for a breaker trip means to react.

16. The method of claim 11, wherein the predetermined condition is a short circuit condition.

17. The method of claim 11, wherein power is supplied substantially continuously to the circuit breaker trip unit during said performing.

18. The method of claim 11, wherein said selecting is performed by recognizing the presence of a function module removably connected to the circuit breaker trip unit.

19. The method of claim 18, wherein said automatically adjusting is performed by recognizing an identification code provided by the function module.

* * * * *

UNITED STATES PATENT AND TRADEMARK OFFICE
CERTIFICATE OF CORRECTION

PATENT NO. : 6,252,365 B1
DATED : June 26, 2001
INVENTOR(S) : Morris et al.

It is certified that error appears in the above-identified patent and that said Letters Patent is hereby corrected as shown below:

Column 3,
Line 62, before "58" delete "module" and insert therefor -- modules --

Column 4,
Line 14, after "an" delete "add on" and insert therefor -- add-on --
Line 35, before "20" delete "line" and insert therefor -- conductor --
Line 41, before "whether" delete "determined" and insert therefor -- determine --

Column 5,
Line 48, after "8" insert therefor -- there is shown --
Line 62, before "the" delete "matter," and insert therefor -- manner, --
Line 64, after "9" insert therefor -- , there is shown --

Column 6,
Line 9, after "relatively" delete "simpler and cheaper" and insert therefor -- simple and cheap --
Line 13, after "any" delete "of"
Line 46, after "contractor" delete "coil-to" and insert therefor -- coil to --

Column 8,
Line 4, after "wherein" delete "said the" and insert therefor -- the said --
Line 16, after "supply" delete "substantially --

Signed and Sealed this

Eleventh Day of January, 2005

JON W. DUDAS
*Director of the United States Patent and Trademark Office*